(12) United States Patent
Barrett et al.

(10) Patent No.: US 7,890,708 B2
(45) Date of Patent: *Feb. 15, 2011

(54) PRIORITIZATION OF OUT-OF-ORDER DATA TRANSFERS ON SHARED DATA BUS

(75) Inventors: Wayne Melvin Barrett, Rochester, MN (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 373 days.

This patent is subject to a terminal disclaimer.

(21) Appl. No.: 12/029,630

(22) Filed: Feb. 12, 2008

(65) Prior Publication Data
US 2008/0140893 A1 Jun. 12, 2008

Related U.S. Application Data

(63) Continuation of application No. 11/004,199, filed on Dec. 3, 2004, now Pat. No. 7,392,353.

(51) Int. Cl.
*G06F 12/00* (2006.01)

(52) U.S. Cl. .................. 711/151; 711/158; 711/121; 711/119; 711/E12.023; 711/E12.033; 710/40; 710/244

(58) Field of Classification Search .......... None
See application file for complete search history.

(56) References Cited

U.S. PATENT DOCUMENTS

| | | | |
|---|---|---|---|
| 4,928,225 A | 5/1990 | McCarthy et al. | |
| 5,535,395 A | 7/1996 | Tipley et al. | |
| 5,546,546 A | 8/1996 | Bell et al. | |
| 5,682,516 A | 10/1997 | Sarangdhar et al. | |
| 5,994,766 A | 11/1999 | Shenoy et al. | |
| 6,205,506 B1 | 3/2001 | Richardson | |
| 6,260,091 B1 | 7/2001 | Jayakumar et al. | |
| 2005/0027946 A1* | 2/2005 | Desai | 711/146 |

OTHER PUBLICATIONS

Intel Product Brief entitled, Intel® E8870 Chipset Scalable Architecture Optimized for the Intel® Itanium® 2 Processor.
Intel® E8870 System Chipset: The Cost-Effective Solution for Scalable Servers, Jun. 2002.
Cuppu, V. and Jacob, B. "Concurrency, Latency, or System Overhead: Which Has the Largest Impact on Uniprocessor DRAM-System Performance?" Proceedings of the 28th Annual International Symposium on Computer Architecture, ACM Press, 2001, p. 62-71.

(Continued)

*Primary Examiner*—Reginald G Bragdon
*Assistant Examiner*—Baboucarr Faal
(74) *Attorney, Agent, or Firm*—Wood, Herron & Evans LLP

(57) ABSTRACT

Uncontested priority is provided to out-of-order data transfers over in-order data transfers on a data bus shared by a plurality of memory requesters. By always granting priority to out-of-order transfers such as deferred read data transfers over in-order transfers such as write and/or cache-to-cache data transfers, it is assured that no newer command or transaction ever negatively affects the latency of an older command or transaction.

17 Claims, 2 Drawing Sheets

OTHER PUBLICATIONS

U.S. Patent and Trademark Office, Office Action issued in related U.S. Appl. No. 11/004,199, dated Oct. 10, 2006.
U.S. Patent and Trademark Office, Final Office Action issued in related U.S. Appl. No. 11/004,199, dated Feb. 16, 2007.
U.S. Patent and Trademark Office, Office Action issued in related U.S. Appl. No. 11/004,199, dated Apr. 30, 2007.
U.S. Patent and Trademark Office, Notice of Allowance issued in related U.S. Appl. No. 11/004,199, dated Nov. 8, 2007.

* cited by examiner

PRIORITIZATION OF OUT-OF-ORDER DATA TRANSFERS ON SHARED DATA BUS

CROSS-REFERENCE TO RELATED APPLICATIONS

This application is a continuation of U.S. patent application Ser. No. 11/004,199 (now issued as U.S. Pat. No. 7,392,353), filed on Dec. 3, 2004, by Wayne Melvin Barrett et al., the entire disclosure of which is incorporated by reference herein.

FIELD OF THE INVENTION

The invention relates to computers and data processing systems, and in particular to scheduling data transfers on a shared data bus.

BACKGROUND OF THE INVENTION

Computer technology continues to advance at a remarkable pace, with numerous improvements being made to the performance of both processors—the "brains" of a computer—and the memory that stores the information processed by a computer. In general, a processor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a processor.

A number of computer designs utilize multiple processors operating in parallel with one another to increase overall computing performance. In a symmetric multiprocessing (SMP) environment, for example, multiple processors share at least a portion of the same memory system to permit the processors to work together to perform more complex tasks. The multiple processors are typically coupled to one another and to the shared memory by a shared bus, often referred to as a system or processor bus, or other like interconnection network.

Many shared memories use multiple levels and arrangements of memory sources to increase system performance in a cost-effective manner. A shared memory, for example, may utilize a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like. One or more memory controllers are then used to swap the information from segments of memory addresses, often known as "cache lines", between the various memory levels to attempt to maximize the frequency that memory addresses requested by a memory requester such as a processor are stored in the fastest cache memory accessible by that requester. In a typical SMP environment, for example, each processor may have one or more dedicated cache memories that are accessible only by that processor (e.g., level one (L1) data and/or instruction caches, and/or a level two (L2) cache), as well as one or more levels of caches and other memories that are shared with other processors in the computer. Processors may also incorporate multiple processing cores and/or be disposed in modules housing multiple processors, and/or may rely upon a separate cache or memory controller to issue memory access requests to lower level memories.

In many designs, a chipset comprising one or more integrated circuit chips interfaces the processors with lower levels of memory and/or an input/output subsystem. Among the various features supported by a chipset is that of scheduling operations or transactions on the system or processor bus. Specifically, whenever a processor or other memory requester core requires access to a particular cache line that is not locally cached, a memory access request or transaction is initiated on the system or processor bus to retrieve the requested data. Typically, the request is forwarded to a memory subsystem to retrieve the requested data from the main memory. In some instances, however, each processor "snoops" the requests issued by other processors on the bus, and may result in another processor initiating a cache-to-cache transfer to fulfill to a memory access request if the other processor has a locally-cached copy of the requested data, which may avert the need to retrieve the data from the main memory altogether. Such systems also typically support the ability for a processor to "cast out" modified data stored in a local cache to update the copy of the data in the main memory, e.g., when the local cache for the processor is full and space is required for other data needed by the processor.

To maximize performance over a shared bus such as a system or processor bus, many conventional designs utilize separate data paths for data and for address and control information. One common architecture, for example, utilizes a data bus for handling data traffic and an address/command bus for handling address and command traffic. Transactions are initiated by communicating a command over the address/command bus, with the command typically including the address of a particular cache line being affected by the command.

Moreover, many designs utilize split transactions, whereby requests for data and responses to those requests are treated as separate operations. A principal benefit of split transactions, particularly with regard to requests to retrieve data from a lower level memory, is that a shared bus is permitted to handle other operations while waiting for the requested data to be returned from the lower level memory.

It has been found that the scheduling data transfers on a data bus can have a significant impact on system performance in a shared bus architecture incorporating split transactions. In many designs, the principal types of data that may be transferred over a data bus can be separated into two groups referred to respectively as in-order and out-of-order data transfers. "In-order" data transfers are principally associated with write operations and cache-to-cache transfer operations (which may also be referred to as explicit and implicit write back operations, respectively). These data transfers are considered "in-order" as the relevant data is typically capable of being transferred over the data bus immediately after the operations are initiated over an address/command bus.

A write operation, which may also be referred to as a cast out operation, is typically initiated by a processor to update a copy of a cache line stored in main memory as a result of the processor needing to discard its own locally cached copy of that cache line when that copy has been modified by the processor. A cache-to-cache transfer operation, which may also be referred to as a local intervention operation, is typically initiated by a processor when that processor detects a read operation initiated by another processor that is directed to a cache line that is locally cached by that processor. As noted above, whenever such a read operation is detected, the processor having the local copy of the cache line "intervenes" in the request, and returns the requested data, thereby averting the comparatively slower access to the main memory.

"Out-of order" data transfers are principally associated with read operations that are directed to cache lines that are not locally cached in any other processor. These read operations are sometimes referred to as "deferred" read operations, as the responses to these operations must be deferred for some indeterminate amount of time until the requested data can be retrieved from main memory. Often the amount of time required to retrieve the requested data cannot be ascertained, and may vary widely, e.g., depending upon whether the requested data is currently stored in the main memory, or must first be paged into the main memory from mass storage. These data transfers are termed "out-of-order" since the read operations upon which they are responsive are deferred while other operations (which may have been issued after such read operations) are processed on the shared bus.

As noted above, the manner in which data transfers are transmitted over a data bus can have a significant impact on system performance. In general, it is desirable to maximize data bus utilization to maximize data throughput and minimize the amount of time that the data bus is idle. It is also desirable, however, to minimize the latency, or delay, required to complete transactions initiated on a shared bus. With respect to read transactions, for example, the latency may be looked at from multiple standpoints, e.g., from the standpoint of average latency, from the standpoint of maximum latency, or from the standpoint of latency distribution. Data bus scheduling may also have an impact on the utilization of the address/command bus, as well as on other facilities in a system.

Conventional data bus scheduling algorithms have typically favored in-order data transfers such as those associated with write operations and cache-to-cache transfer operations, granting priority to any in-order data transfer over out-of-order data transfers when both types of data transfers are awaiting transfer over the data bus at the same time. Some algorithms also attempt to provide balance between both types of data transfers, e.g., by favoring in-order data transfers over out-of-order data transfers unless the number of pending out-of-order data transfers exceeds a threshold.

To date, however, conventional data bus scheduling algorithms have not provided optimal system performance. As such, a need continues to exist for a data bus scheduling algorithm providing improved system performance

SUMMARY OF THE INVENTION

The invention addresses these and other problems associated with the prior art by providing uncontested priority to out-of-order data transfers over in-order data transfers on a data bus shared by a plurality of memory requesters. By always granting priority to out-of-order transfers such as deferred read data transfers over in-order transfers such as write and/or cache-to-cache data transfers, it is assured that no newer command or transaction ever negatively affects the latency of an older command or transaction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
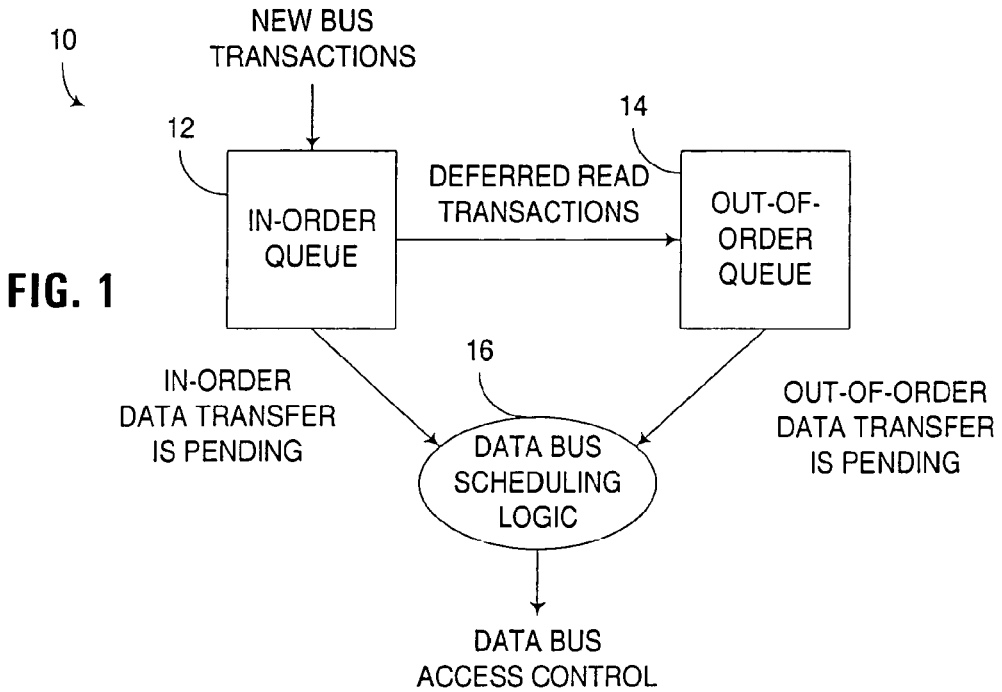
FIG. 1 is a functional block diagram illustrating the scheduling of data transfers on a data bus in a manner consistent with the invention.

The embodiments discussed and illustrated hereinafter utilize data bus scheduling logic that provides uncontested priority to out-of-order data transfers over in-order data transfers awaiting communication over a data bus. In an exemplary embodiment of the invention, uncontested priority refers to an algorithm where a pending out-of-order data transfer, i.e., an out-of-order data transfer that is ready to be transmitted over the data bus, is always granted access to the data bus irrespective of whether any in-order data transfer is currently pending. Moreover, uncontested priority in such an algorithm results in pending in-order data transfer being granted access to the data bus only if no out-of-order data transfer is currently pending.

An in-order data transfer within the context of the invention refers to a data transfer that is ready to be transferred over the data bus immediately after its associated operation has been initiated. In an exemplary embodiment of the invention where a shared bus incorporates split transactions and a data bus that is separate from the bus over which address and command information is communicated, an in-order data transfer is a data transfer that is ready to be initiated once the associated command is communicated over the separate bus. While other types of data transfers may be considered in-order data transfers consistent with the invention, two such types of data transfers include write or cast out data transfers, typically initiated to write back or cast out a modified cache line to memory, and cache-to-cache or intervention data transfers, typically initiated to reply to read requests directed to locally cached cache lines. In this regard, cache-to-cache or intervention data transfers may also be considered to be forms of in-order read data responses, given they are initiated in response to a read request.

An out-of-order data transfer within the context of the invention refers to a data transfer that is "out of order" with respect to the transaction traffic on a shared bus, and is typically ready to be transferred some time after its associated operation has been initiated. In the aforementioned exemplary embodiment, an out-of-order data transfer is typically a deferred read data transfer initiated in response to receiving requested data from main memory that was originally requested by a deferred read request.

As noted above, embodiments consistent with the invention provide uncontested priority to out-of-order data transfers over in-order data transfers. As with any data bus scheduling algorithm, several issues arise with respect to the effect of the algorithm on system performance. One such issue is the importance of maximizing data bus utilization. Another such issue is the importance of read response latency in a loaded system. Yet another such issue is the importance of the distribution of read latencies in a loaded system. Still another such issue is whether it is acceptable for a data bus scheduling algorithm to introduce negative effects on other facilities, e.g., an address and/or command bus.

A basic principle upon which the herein-described algorithm is based is that no newer operation or command should be allowed to negatively effect the latency of an older operation or command. It is believed that following this principle should be paramount over any other related issues such as data bus bandwidth, data bus utilization, or negative side effects potentially caused on facilities other than the data bus. Furthermore, it is believed that following this principle should maximize processor performance and simplify implementation of a data bus scheduler.

It is furthermore believed that the herein-described algorithm will provide optimal scheduling in a number of different embodiments consistent with the invention. For example, many processors include branch prediction and prefetch circuitry. When a processor reaches a branch point in the instruction stream, it may fetch data and code relating to multiple code paths prior to knowing which path it will actually take. Because of this behavior, the data that will provide the processor with the information as to which code path to take is usually the most important piece of information to give to the processor. Any transaction that started after that particular read (to obtain the branch decision information) is by default of lesser importance. Allowing any activity introduced by a subsequent transaction to impact the latency of that read data (with the branch decision information) would typically lead to reduced performance. Another way of phrasing this point is that the delivery of "old" data is of greater importance than any "new" data or new bus activity.

Also, it is believed that even if granting uncontested priority to out-of-order data transfers begins to impact the initiation of future bus activity, the effects of stalling pending in-order traffic, and even stalling the initiation of new transactions, may not be significant enough to outweigh the benefit of achieving the minimal latency for older read transactions. In particular, even when no new transactions are allowed to start, e.g., due to an in-order queue being full, typically there are still enough transactions queued up, and plenty of overlap in progress, to maintain a healthy future data bus flow.

It is also believed that in many embodiments the distribution curve of read latencies should be kept as narrow as possible, and thus, it is typically desirable to minimize the maximum latency value on a latency distribution curve. This can only be achieved by following the principle noted above. If there was a choice between two possible latency distribution curves, where both of them had the same "average" latency, the distribution with the narrowest curve would typically provide the better processor performance. By eliminating large "high-flyer" latencies, the processors can continue to make the best progress. Processors often times try to be as productive as possible while waiting for data from memory. Once any miscellaneous productive work is complete, then the processor can become completely stalled waiting for its data return. Hence, if a processor has to wait N cycles for data to be returned, the cycles of N−1, N−2 and N−3 have a greater negative impact on performance than do the cycles 1, 2 and 3.

It is additionally believed that achieving the highest data bus utilization rate, on it's own merit, is not as important in some embodiments as achieving a low maximum read latency. In a system where the data bus is the critical factor to performance, the data bus utilization will naturally be very high. However, if a decision presents itself to the data bus scheduling logic where it can choose some in-order activity (to maximize data bus utilization) or the delivery of "old" out-of-order data, it is believed the most beneficial choice would be to deliver the old data. Any potential help to future latencies is not as important as the definite help given to an older command.

Turning to the Drawings, wherein like numbers denote like parts throughout the several views, FIG. 1 illustrates the scheduling data transfers on a data bus in a manner consistent with the invention. Specifically, FIG. 1 illustrates a circuit arrangement 10 incorporating an in-order queue 12, out-of-order queue 14, and data bus scheduling logic 16 suitable for granting access to various memory requesters over a data bus. It is assumed that in this embodiment, each memory requester is a processor with local caching and the ability to snoop the requests issued by other processors and initiate cache-to-cache transfers should another processor request a locally cached cache line. It is also assumed that, for any read request that is incapable of being handled by one of the processors, the read request is deferred until the data is retrieved from a main memory.

As shown, new bus transactions are initially received by in-order queue 12 and are stored and tracked in the queue a manner known in the art. In-order queue 12 notifies data bus scheduling logic 16 of any bus transactions for which a data transfer is ready and pending, i.e., when the data to be transferred over the data bus for a given transaction is available for immediate transfer. In addition, for any bus transactions that do not have data transfers that are ready and pending (e.g., read transactions that cannot be satisfied by another processor, and must be handled by the main memory), these transactions are passed to out-of-order queue 14 to await completion. Once any such deferred transactions do reach a stage where a data transfer therefor is ready and pending, out-of-order queue 14 notifies data bus scheduling logic 16 as such.

Based upon the notifications from queues 12, 14 of pending data transfers, data bus scheduling logic 16 grants access to the appropriate devices coupled to the data bus (e.g., a memory requester for any in-order data transfers, or logic coupled to the main memory for an out-of-order data transfer). Consistent with the invention, whenever out-of-order queue 14 indicates that an out-of-order data transfer is pending, logic 16 will grant uncontested priority to that data transfer over any pending data transfer identified in in-order queue 12.

Figure 2:
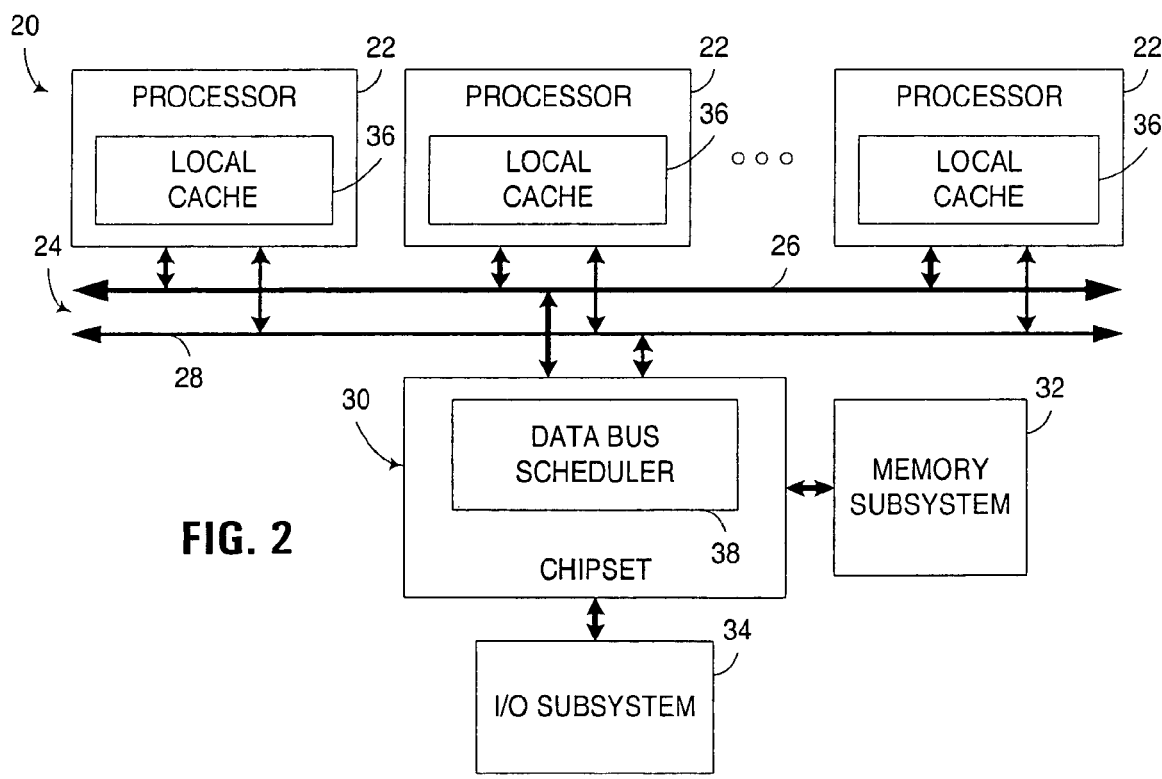
FIG. 2 is a block diagram an exemplary implementation of a computer incorporating a split transaction processor bus and data bus scheduler consistent with the invention.

Now turning to an exemplary implementation of data bus scheduling logic consistent with the invention, FIG. 2 illustrates a computer 20 that represents one suitable environment within which the herein-described data bus scheduling logic may be implemented in a manner consistent with the invention. Computer 20 generically represents, for example, any of a number of multi-user computers such as a network server, a midrange computer, a mainframe computer, etc. However, it should be appreciated that the invention may be implemented in practically any device capable of utilizing a data bus that serves multiple memory requesters, including other computers and data processing systems, e.g., in single-user computers such as workstations, desktop computers, portable computers, and the like, or in other programmable electronic devices (e.g., incorporating embedded controllers and the like), such as set top boxes, game machines, etc.

Computer 20 generally includes one or more processors 22 coupled to system or processor bus 24 including separate address/command and data buses 26, 28. Also coupled to system bus 24 is a chipset 30, which provides connectivity to a memory subsystem 32 and input/output subsystem 34.

Each processor 22 typically includes one or more levels of local cache memory 36. Additional levels of cache memory may also be disposed in chipset 30 and/or memory subsystem 32. Each processor 22, in this context, functions as a memory requester insofar as the processor is capable of issuing requests over the system bus to read or write data from or to memory subsystem 32 and/or input/output subsystem 34. In other embodiments, each processor may incorporate multiple processing cores and/or implement hardware-based multi-threading. Moreover, in some embodiments multiple processors may be disposed on a common module and coupled to system bus 24, with the multiple processors in each module coupled via intermediate circuitry (e.g., a cache or memory controller) that itself functions as a memory requester on system bus 24. In general, any logic circuitry capable of issuing read and/or write requests on a system bus may function as a memory requester within the context of the invention.

Chipset 30 may be implemented using one or more integrated circuit devices, and may be used to interface system bus 24 with one or more memory ports (or interfaces) coupled to a memory subsystem, and/or with one or more I/O ports (or interfaces) coupled to an I/O subsystem. A chipset consistent with the invention may also be utilized to interface with other electronic components, e.g., graphics controllers, sound cards, firmware, service processors, etc. Moreover, chipset 30 may be utilized in complex systems to interface with other chipsets to provide a highly scalable multi-node architecture.

Within chipset 30 is a data bus scheduler 38 that selectively grants access to data bus 28 to various components coupled thereto, e.g., the memory requesters and the chipset itself (e.g., for returning read data retrieved from main memory in response to a deferred read request), based upon the herein-described data bus scheduling algorithm. It will be appreciated, however, that data bus scheduling logic may be disposed in other logic circuitry in other embodiments consistent with the invention.

Computer 20, or any subset of components therein, may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more logic circuits that circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Figure 3:
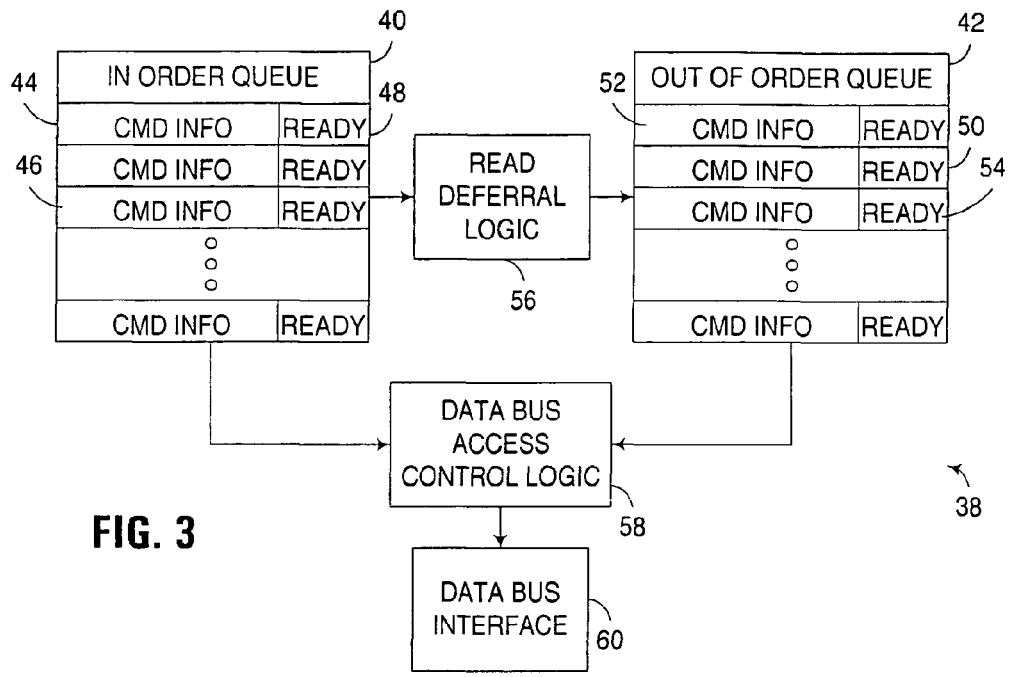
FIG. 3 is a block diagram of one exemplary implementation of the data bus scheduler of FIG. 2.

An exemplary implementation of data bus scheduler 38 is illustrated in greater detail in FIG. 3. Specifically data bus scheduler 38 includes an in-order queue 40 and an out-of-order queue 42. In-order queue 42 includes a plurality of entries 44, each including various command information 46 used to track the progress of an associated command or transaction issued over the address/command bus 26, e.g., a command tag, transaction length, coherency information, etc. Also included in information 46 is a ready field 48, which is used to indicate that data associated with the command or transaction is ready to be transferred over the data bus. When ready field 48 is set, it is assumed that a data transfer for the associated command or transaction is currently pending on the in-order queue.

In the exemplary implementation, queue 40 merely tracks the status of a command or transaction, and does not store the data to be transferred itself, or some of the actual command information. Typically, the data to be transferred will be retained by the processor that issued the associated command or transaction, and then transmitted over the data bus once the processor is granted access to the data bus by the data bus scheduler. It will be appreciated that in other embodiments, queue 40 may store additional information about a command or transaction, including some or all of the data to be transferred over the data bus. It will also be appreciated that other data structures and/or data organizations may be used in lieu of an in-order queue in other embodiments consistent with the invention.

Similar to queue 40, out-of-order queue 42 includes a plurality of entries 50, each including various command information 52 used to track the progress of an associated command or transaction passed to the queue by read deferral logic 56. Included in information 52 is a ready field 54, which is used to indicate that data associated with the command or transaction is ready to be transferred over the data bus. When ready field 54 is set, it is assumed that a data transfer for the associated command or transaction is currently pending on the out-of-order queue.

Also, as with queue 40, queue 42 in the exemplary implementation merely tracks the status of a command or transaction, and does not store the data to be transferred itself, or some of the actual command information. Typically, the data to be transferred will be sourced by the main memory, and then transmitted over the data bus once access is granted by the data bus scheduler. Given that out-of-order data transfers are granted uncontested priority, no buffering of the data to be transferred from main memory to the data bus may be required, so long as suitable notification is provided of the arrival of the data from main memory (where such notification may simply take the form of setting ready field 54 in some embodiments). In other embodiments, however, the returning data may be buffered in a suitable data structure in the chipset prior to being output over the data bus. It will be appreciated that in other embodiments, queue 42 may store additional information about a command or transaction, including some or all of the data to be transferred over the data bus. It will also be appreciated that other data structures and/or data organizations may be used in lieu of an out-of-order queue in other embodiments consistent with the invention. For example, it will be appreciated that queues 40 and 42 could be combined in other embodiments.

As noted above, out-of-order queue 42 is filled with commands or transactions by read deferral logic 56, when it is detected that a given command or transaction is a deferred read transaction. When a command or transaction is moved to queue 42, it is typically removed from queue 40.

Both of queues 40, 42 are monitored by data bus access control logic 58, which predominantly monitors the ready fields 48, 54 of the various entries in queues 40, 42, and thereafter grants access to data bus 28 as data transfers become ready and pending. Access is granted by asserting appropriate signals over a data bus interface 60, which is used to couple chipset 30 to data bus 28.

It will be appreciated that the manner in which transactions are queued and tracked, the manner in which transactions are removed from a queue, the manner in which transactions are moved from an in-order queue to an out-of-order queue, the manner in which access is granted to particular device on a data bus, and the manner in which a data transfer is formatted for transmission over a data bus, would be well within the knowledge of one of ordinary skill in the art having the benefit of the instant disclosure. For example, it will be appreciated that the herein-described data scheduling algorithm may be readily implemented in a chipset that is compatible with the Itanium or Xeon processors available from Intel Corporation, e.g., the Intel E8870 chipset.

Figure 4:
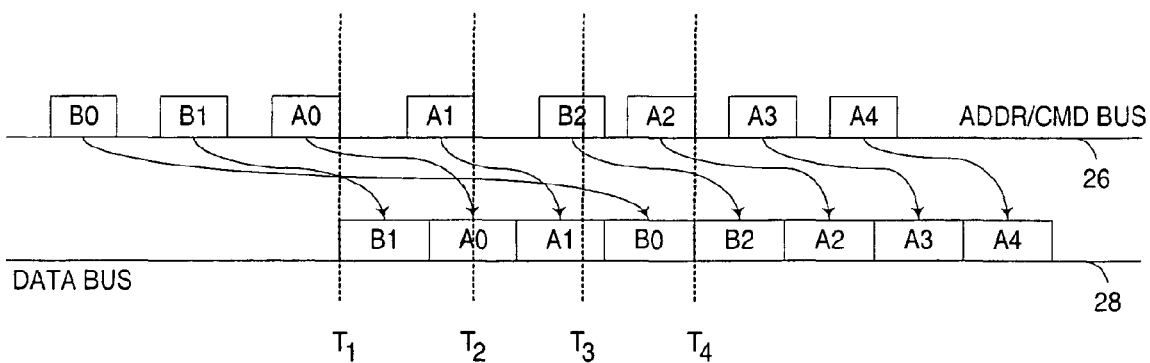
FIG. 4 is a functional timing diagram illustrating the scheduling of data transfers in the computer of FIG. 2.

FIG. 4 next illustrates an exemplary sequence of commands issued over address/command bus 26, and the resulting data transfers performed on data bus 28 as a result of the issuance of commands, in computer 20. In this exemplary sequence, in-order commands and data transfers are designated as A0-A4, while out-of-order commands and data transfers are designated as B0-B2.

Assume, first, that two commands B0 and B1 are issued in sequence on bus 26, and that both commands are read requests that are ultimately deferred. Thereafter, another command A0, which is not deferred, is then issued. Assume also that, prior to, or concurrent with, the data transfer for command A0 becoming pending, the data transfer for command B1 also becomes pending, e.g., at time T1. Also assume that the data transfer for command B0 does not become pending at this time. As a result of this sequence of events, priority is granted to the data transfer for command B1, which is then initiated on the data bus 28. Once this data transfer is complete, access is granted to the data transfer for command A0.

Next, assuming at time T2 that another in-order command A1 becomes pending, but that the data transfer for command B0 has not yet become pending. As a result, access will then be granted on the data bus for the data transfer for command A1. Even if, as illustrated at time T3 that the data transfer for command B0 does become pending, the data transfer for command A1 will complete, with the next available time slot granted for the data transfer for command B0.

Next, assume that as of time T4 another out-of order command B2 has been issued, as has another in-order command A2. Assume also that as of this time, both data transfers become pending. In that event, priority is granted to the data transfer for out-of-order command B2, then to the data transfer for in-order command A2. Finally, two additional in-order commands A3, A4 are shown being issued on bus 26, with access being granted to the data transfers for each of these commands after completion of the data transfer for command A2.

It will be appreciated that various modifications may be made to the illustrated embodiments consistent with the invention. It will also be appreciated that implementation of the functionality described above within logic circuitry disposed in a chipset or other appropriate integrated circuit device, would be well within the abilities of one of ordinary skill in the art having the benefit of the instant disclosure.

What is claimed is:

1. An apparatus, comprising:

a shared bus configured to support split transactions, the shared bus including a data bus;

a plurality of processors coupled to the shared bus, each processor configured to issue read and write requests directed to cache lines in a memory address space, and each processor including a local cache and further configured to snoop read and write requests issued by other processors coupled to the shared bus, wherein each processor is further configured to issue cache-to-cache data transfers to forward data from cache lines that are cached in the local cache of such processor to other processors in response to snooping read requests issued by such other processors and directed to such cache lines, and to issue write requests to write back modified data to a memory;

a chipset coupled to the shared bus and configured to forward read requests issued by processors that are directed to cache lines that are not cached in any local cache to a memory, and to issue deferred read data transfers over the data bus to return such cache lines to such processors when such cache lines are provided to the chipset by the memory;

a first queue disposed in the chipset and configured to temporarily queue pending cache-to-cache data transfers and write data transfers prior to transmission over the data bus;

a second queue disposed in the chipset and configured to temporarily queue pending deferred read data transfers prior to transmission over the data bus;

read deferral logic disposed in the chipset and coupled to the first and second queues, the read deferral logic configured to move a read data transfer initially queued in the first queue from the first queue to the second queue upon detecting that the read data transfer is a deferred read data transfer; and data bus scheduling logic disposed in the chipset and coupled to the first and second queues, the data bus scheduling logic configured to schedule the output of pending transfers queued by the first and second queues, the data bus scheduling logic configured to provide uncontested priority to data transfers pending in the second queue over data transfers pending in the first queue such that uncontested priority is provided to a first deferred read data transfer over a second cache-to-cache data transfer that is ready and pending concurrently with the first deferred read data transfer.

2. A circuit arrangement, comprising:

a data bus interface configured to couple to a plurality of memory requesters over a data bus;

data bus scheduling logic coupled to the data bus interface and configured to provide uncontested priority to out-of-order data transfers over in-order data transfers, wherein the data bus scheduling logic is further configured to provide uncontested priority to a first out-of-order data transfer over a second in-order implicit write back data transfer that is ready and pending concurrently with the first out-of-order data transfer;

an out-of-order queue and an in-order queue respectively configured to temporarily queue pending out-of-order data transfers and pending in-order data transfers; and read deferral logic coupled to the out-of-order and in-order queues, the read deferral logic configured to move a read data transfer initially queued in the in-order queue from the in-order queue to the out-of-order queue upon detecting that the read data transfer is a deferred read data transfer.

3. The circuit arrangement of claim 2, wherein the data bus is of the type that supports split transactions.

4. The circuit arrangement of claim 2, further comprising a command bus interface configured to couple to the plurality of memory requesters by a command bus.

5. The circuit arrangement of claim 2, wherein the out-of-order and in-order queues each include a plurality of entries, each entry associated with a data transfer, and each entry including command data associated with a request that initiated the associated data transfer and a ready indicator indicating whether the associated data transfer is pending, and wherein the data bus scheduling logic is configured to determine that a data transfer in either of the out-of-order and in-order queues is pending by accessing the ready indicator in the entry associated with such data transfer.

6. The circuit arrangement of claim 2, wherein the data bus scheduling logic is configured to provide uncontested priority to out-of-order data transfers over in-order data transfers by initiating each pending out-of-order data transfer queued by the out-of-order queue prior to initiating any pending in-order data transfer queued by the in-order queue.

7. The circuit arrangement of claim 2, wherein the data bus scheduling logic is configured to provide uncontested priority to out-of-order data transfers over in-order data transfers by initiating a pending in-order data transfer queued by the in-order queue only if no pending out-of-order data transfer is currently queued by the out-of-order queue.

8. The circuit arrangement of claim 2, wherein the read deferral logic is configured to move a read data transfer associated with a read request issued by a processor coupled to the data bus prior to receiving any reply to the read request.

9. The circuit arrangement of claim 2, wherein the circuit arrangement further comprises a memory interface configured to couple to a shared memory, and wherein each deferred read data transfer is configured to initiate a transfer of data returned by the shared memory over the data bus.

10. The circuit arrangement of claim 2, wherein the in-order data transfers include explicit write back data transfers.

11. The circuit arrangement of claim 2, wherein the in-order data transfers include implicit write back data transfers.

12. The circuit arrangement of claim 2, wherein each memory requester is of the type including a local cache, and wherein the in-order data transfers include cache-to-cache data transfers, at least one cache-to-cache data transfer configured to forward data from the local cache of a first memory requester to the local cache of a second memory requester in response to a read request issued by the second memory requester for data that is cached in the local cache of the first memory requester.

13. The circuit arrangement of claim 12, wherein the cache-to-cache data transfer is initiated by the first memory requester in response to a snoop of the read request issued by the second memory requester.

14. The circuit arrangement of claim 2, wherein each of the plurality of memory requesters comprises a processor.

15. The circuit arrangement of claim 2, further comprising a plurality of memory requesters and a data bus coupling the plurality of memory requesters to the data bus interface.

16. An integrated circuit device comprising the circuit arrangement of claim 2.

17. A chipset comprising the circuit arrangement of claim 2.

* * * * *